United States Patent

[11] 3,536,222

| [72] | Inventor | Wilford V. Patnode |
| --- | --- | --- |
| | | St. Paul, Minnesota |
| [21] | Appl. No. | 723,099 |
| [22] | Filed | April 22, 1968 |
| [45] | Patented | Oct. 27, 1970 |
| [73] | Assignee | Elmer Geiger |
| | | South St. Paul, Minnesota |
| | | a fractional part interest |

[54] BUCKET ATTACHMENT FOR COMPACT TRACTORS
2 Claims, 3 Drawing Figs.

[52] U.S. Cl. ............................................. 214/766
[51] Int. Cl. .............................................. B66f 9/00
[50] Field of Search ................................. 214/766, 140, 146, 145, 149, 780; 37/118, 124

[56] References Cited
UNITED STATES PATENTS

| 2,330,847 | 10/1943 | Seal | 214/766X |
| 2,658,634 | 11/1953 | Waller | 214/766 |
| 2,738,084 | 3/1956 | Schulz | 214/766X |
| 3,198,357 | 8/1965 | Shelby | 214/766 |
| 3,362,554 | 1/1968 | Fortier | 214/766 |

Primary Examiner—Hugo O. Schulz
Attorney—James E. Olds

ABSTRACT: A bucket and mounting frame attachment for compact tractors is provided which, by utilization of the existing tractor power supply, can perform the tasks of shoveling, carrying and dumping.

Patented Oct. 27, 1970 3,536,222

INVENTOR.
WILFORD V. PATNODE
BY
James E. Olds
ATTORNEY

BUCKET ATTACHMENT FOR COMPACT TRACTORS

BACKGROUND OF THE INVENTION

1. Field of the Invention

This invention relates to an implement attachment for garden-type or compact tractors; more particularly, it relates to a bucket and mounting means adaptable for use with garden-type tractors.

2. Description of the Prior Art

Garden-type tractors have gained increasing popularity with the home owner, especially those with sufficient acreage to warrant the use of power equipment. In large part, this popularity is due to the variety of attachments for such tractors which can perform innumerable tasks including lawn mowing, plowing, cultivating, tilling, leaf and other common lawn debris pickup, etc. These implements are attached at either the front or rear of the tractor. In view of the predominantly nonindustrial market in which such relatively low horsepower tractors are sold and used, it is particularly necessary to provide attachments which combine the features of versatility, economy, and ease of attachment. To date, there has not been provided a bucket or loader attachment for compact tractors which embodies these features. Bucket attachments are available which require separate hydraulic systems for operation but the cost and unwieldiness of the combination far exceed commercially acceptable levels considering the nonindustrial market to be served.

It is therefore an object of this invention to provide a bucket attachment for compact tractors which can utilize the existing power supply of such tractors.

Another object is a bucket attachment which can perform the tasks of shoveling or pickup, carrying, and dumping.

Another object is a bucket attachment for tractors which is low in cost and which can be readily attached to compact tractors without the need for special equipment or skills.

SUMMARY OF THE INVENTION

These and other objects are accomplished by the present invention which comprises: an attachment for a compact tractor equipped with one or both of a front and rear power lift system, said attachment comprising in combination: a frame pivotally connected to said compact tractor, linking means for operatively connecting said frame to the power lift system of the tractor, a bucket pivotally mounted on said frame, and trip means mounted on said frame, said trip means being releasably engageable with said bucket means whereby pivoting and nonpivoting of said bucket can be controlled by operation of said trip means.

BRIEF DESCRIPTION OF THE DRAWING

The invention can be more fully understood by reference to the accompanying drawings wherein.

DESCRIPTION OF THE PREFERRED EMBODIMENTS

Figures 1, 2, 3:
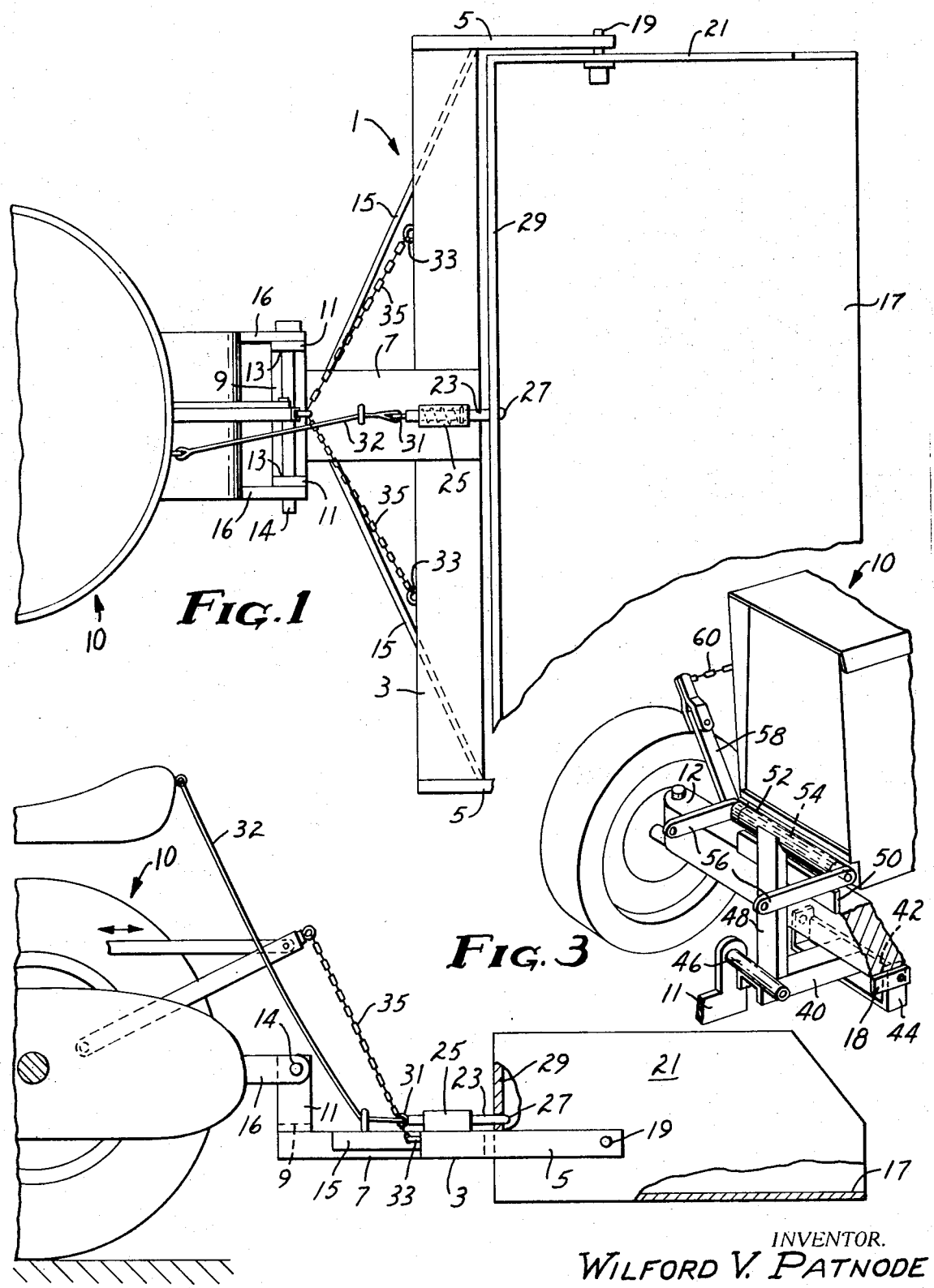
FIG. 1 is a top view of the bucket and mounting frame of this invention.
FIG. 2 is a side elevation of the bucket and mounting frame of FIG. 1.
FIG. 3 is a perspective of a front mount adapter for the frame and bucket of FIGS. 1 and 2.

Referring to FIGS. 1 and 2, there is shown a mounting frame 1 having a main body portion 3, a pair of terminal arms 5 extending from the body portion 3, and a central extension portion 7 to which is welded a transverse member 9 having a pair of upwardly extending ear members 11. Ear members 11 have aligned holes 13 cut therein through which may be inserted a pin 14 to pivotally connect the frame 1 to either the drawbar 16 of the tractor or to the transverse cylindrical members 46 of the front mount adapter illustrated in FIG. 3. Braces 15 extend from the central extension portion 7 to the main body portion 3 of frame 1 at a point near arms 5 of frame 1. Bucket 17 is pivotally attached to frame 1 by means of two pins 19 secured to arms 5 and extending just through the side walls 21 of bucket 17. Mounted equidistant from the ends of main body portion 3 of frame 1, and approximately axially aligned with central extension portion 7, is a spring-loaded pin 23 journaled in bearing 25. Pin 23 terminates in a pointed portion 27 which extends slightly through the rear wall 29 of bucket 17. On the other end of the pin 23 is located a ring piece 31 to which may be attached a strong cord or the like 32 which extends to a point where it can be grasped by the tractor operator while he is driving the tractor. The spring-loaded pin 23 when in its loaded configuration, i.e., extending slightly through the rear wall 29 of bucket 17, serves to maintain the bucket in a rigid, nonpivoting position. By pulling on the string, the tractor operator withdraws pin 23 from engagement with the rear wall 29 of bucket 17 and the bucket is thus free to rotate about pins 19. In doing so, the bucket assumes its dumping position.

On the back face of main body portion 3 of frame 1 are located two equally spaced rings 33 to each of which is attached one end of a linking member 35, suitably a heavy linked steel chain. The other end of each of the linking members 35 is attached to either the rear or front lift mechanism of a conventional garden-type tractor, typical ones being the "Simplicity" Models 700 and 725 Landlord four wheel tractors.

The bucket and frame assembly illustrated in FIGS. 1 and 2 can be mounted on either the front or rear of garden-type tractors such as the Simplicity Models mentioned above. For rear mounting, the frame 1 can be directly connected to the tractor body without special mounting means such that the bucket can be manipulated through the drawbar and rear lift mechanism, in conjunction with the trip mechanism, to perform the desired loading, unloading and carrying tasks. For front mounting, however, the standard compact tractor is fitted with an adapter such as is illustrated in FIG. 3.

Referring to FIG. 3, the front mount adapter has a longitudinal body portion 40 at one end of which is welded or otherwise permanently attached a transverse channel piece 42 which has upwardly depending terminal members 44. Each of these terminal members 44 has a hole drilled therein by which the mount adapter can be fixedly attached to the front mower mount of a standard compact tractor. At the end of the longitudinal body portion 40 away from channel piece 42 is a transverse cylindrical member 46. The bucket 17 via the mounting frame 1, illustrated in FIGS. 1 and 2, is pivotally connected to the front mount adapter by inserting pins or the like through the holes in ear members 11 (FIG. 1) and through the transverse cylindrical member 46. Intermediate the channel piece 42 and cylindrical member 46, and closer to the latter, is attached to the body portion 40 a vertical channel member 48. Across the face of vertical channel member 48 about two-thirds from the bottom is a plate 50 which, when the adapter is mounted on the tractor abuts the top portion of the front axle of the tractor. At the top of the channel piece 48 and transverse to the axis thereof is a cylindrical bearing 52 in which is journaled a pivotally rotatable shaft 54 which terminates on each end in parallel arm members 56. On the righthand end of shaft 54 and extending therefrom at an angle of about 75° from arm 56 is a second arm 58. When shaft 54 is rotated such that arms 56 are vertical (i.e., perpendicular to the axis of shaft 54), second arm 58 extends rearward toward the tractor body if the adapter were mounted. Near the end of second arm 58 is a hole through which can be attached one end of a linking member 60 such as a heavy linked chain, the other end of which will be attached to the power lift for front mounted equipment. Near the ends of arms 56 are also a pair of axially aligned holes. The front mount adapter is positioned on the garden tractor 10 by placing the plate 50 on the top of the front axle 12 of the garden tractor 10 wherein such placement will cause the longitudinal body 40 to abut against the bottom of the front axle 12. After the adapter has been properly placed on the tractor 10, bolts (not shown) are inserted through the holes shown in terminal members 44 and through corresponding holes in the supports 18 of the tractor 10 to secure adapter to the tractor 10. For attaching the bucket 17 via the frame of FIGS. 1 and 2 to the adapter, one end of a chain or the like will be attached to one of the arms 56, e.g., the right arm, and the other end will be attached to the corresponding ring 33 on the main body portion of frame 1 (FIG. 1). Another chain will connect the left arm 56 and the corresponding ring 33. By these chains, the frame and bucket of FIGS. 1 and 2 are connected to the pivotally rotatable shaft 54 through arms 56, and the shaft 54 in turn is connected via second arm 58 to the power lift for front attachments. Thus, by manipulating the power lift, the bucket can be operated.

The mounting frame 1 and the front mount adapter are of steel construction. The bucket is constructed of a relatively heavy gauge steel sheeting. For tractors having a hydraulic lift, the bucket can lift upwards of 150 pounds, about 100 pounds with a manual lift.

It is to be understood that the present invention as above described can be varied in numerous details without departing from the spirit and scope thereof.

I claim:

1. A bucket attachment for a compact garden tractor equipped with a rear power lift system, wherein said attachment comprises:
   a. a frame, said frame including:
      1. two ear members each including apertures to permit pivotable connection of said frame to a fixed drawbar of a garden tractor;
      2. a central extension portion rigidly secured to both of said ear members and extending rearwardly of said ear members and longitudinally of the garden tractor;
      3. a main body portion generally centrally located rearwardly of the rear tractor wheels and rigidly secured to said central extension, said main body portion extending transverse of the garden tractor, said main body portion having a length longer than the inside distance between the rear wheels of the garden tractor;
      4. two terminal arms each rigidly secured to opposite transverse ends of said main body portion, said arms extending rearwardly and longitudinally of the garden tractor;
   b. a four walled bucket having a bottom wall, two side walls and a rear wall including an aperture therein, said bucket having an open portion for scooping material, said bucket located rearwardly and adjacent to said main body portion and between said two terminal arms wherein said open portion extends rearwardly of said tractor and said rear wall is adjacent to said main body portion;
   c. two pins each secured to the rearward ends of said terminal arms and each secured forwardly of the centroid of said bucket for permitting pivotable dumping movement of said bucket when the bucket is released wherein said open portion of said bucket will pivotably rotate about said pins toward the ground;
   d. a spring-loaded pin slidably secured to said frame and biasedly extending rearwardly through said aperture in said rear wall of said bucket to prevent rotation of said bucket relative to said frame;
   e. a cord secured to said spring-loaded pin to afford forward movement of said pin to withdraw said pin from said aperture to permit dumping of said bucket;
   f. two linking members wherein each member is pivotably secured to said main body portion adjacent to said bucket and at a transverse location transversely outside the pivotably connected ear members, each of said members being pivotally attached to a rear power lift to form a triangular configuration between the power lift, said linking members, and said main body portion to provide additional stability of said frame pivotably connected to said draw bar.

2. A bucket attachment for a compact garden tractor equipped with a front power lift system, wherein said attachment comprises:
   a. an adapter rigidly connected to the front portion of a garden tractor, said adapter including three pivotable support arms wherein the three arms are rigidly secured to each other;
   b. a frame, said frame including:
      1. two ear members each pivotably connected to said adapter;
      2. a central extension portion rigidly secured to both of said ear members and extending forwardly of said ear members and longitudinally of the garden tractor;
      3. a main body portion generally centrally located forwardly and rigidly secured to said central extension, said main body portion extending transverse of the garden tractor, said main body portion having a length longer than the inside distance between the rear wheels of the garden tractor;
      4. two terminal arms each rigidly secured to opposite transverse ends of said main body portion, said arms extending forwardly and longitudinally of the garden tractor;
   c. a four walled bucket having a bottom wall, two side walls and a rear wall including an aperture therein, said bucket having an open portion for scooping material, said bucket located forwardly and adjacent to said main body portion and between said two terminal arms wherein said open portion extends forwardly of said tractor and said rear wall is adjacent to said main body portion;
   d. two pins each secured to the forward ends of said terminal arms and each secured rearwardly of the centroid of said bucket for permitting pivotable dumping movement of said bucket when the bucket is released wherein said open portion of said bucket will pivotably rotate about said pins toward the ground;
   e. a spring-loaded pin slidably secured to said frame and biasedly extending forwardly through said aperture is said rear wall of said bucket to prevent rotation of said bucket relative to said frame;
   f. a cord secured to said spring-loaded pin to afford rearward movement of said pin to withdraw said pin from said aperture to permit dumping of said bucket; and
   g. two linking members wherein each member is pivotably secured to said main body portion adjacent to said bucket and at a transverse location transversely outside the pivotably connected ear members, each of said members being pivotally attached to two of said pivotable support arms wherein when the third support arm is rotated by the front power system the other two support arms will pivotably rotate said frame about the pivotable connection between said ear members and said adapter.